United States Patent [19]

Graham et al.

[11] 4,097,960

[45] Jul. 4, 1978

[54] POULTRY PROCESSING SYSTEM

[76] Inventors: Kenneth Z. Graham, Rt. 2, Dawsonville, Ga. 30354; Johnny R. Graham, Rt. 8, Gainesville, Ga. 30501

[21] Appl. No.: 736,544

[22] Filed: Oct. 28, 1976

[51] Int. Cl.² ............................................. A22C 21/00
[52] U.S. Cl. ...................................................... 17/11
[58] Field of Search ...................... 17/11, 12, 44, 44.1; 119/151

[56] References Cited

U.S. PATENT DOCUMENTS

| | | | |
|---|---|---|---|
| 2,828,506 | 4/1958 | O'Donnell | 17/12 |
| 2,854,690 | 10/1958 | O'Donnell | 17/12 |
| 2,924,846 | 2/1960 | Zebarth | 17/12 |
| 2,957,198 | 10/1960 | Ciancioco et al. | 17/11 |
| 2,993,228 | 7/1961 | Zebarth | 17/12 |
| 3,038,197 | 6/1962 | Turner | 17/11 |
| 3,056,161 | 10/1962 | Zebarth | 17/11 |
| 3,137,892 | 6/1964 | Best et al. | 17/11 |
| 3,277,514 | 10/1966 | Hooley | 17/11 |
| 3,490,092 | 1/1970 | Harrison | 17/11 |
| 3,510,907 | 5/1970 | Rejsa et al. | 17/11 |
| 3,522,623 | 8/1970 | Pyran | 17/11 |
| 3,833,966 | 9/1974 | Harben, Jr. | 17/11 |
| 3,965,534 | 6/1976 | Harben, Jr. | 17/11 |
| 3,979,793 | 9/1976 | Hazenbroek | 17/11 |

*Primary Examiner*—Russell R. Kinsey
*Assistant Examiner*—Paul J. Hirsch
*Attorney, Agent, or Firm*—Jones, Thomas & Askew

[57] ABSTRACT

In a poultry processing plant where birds are conveyed in a suspended series through the plant in a neck-down attitude, a series of bird holders are moved up an incline from below the path of the birds in timed relationship with the movement of the birds until the bird holders at least partially support the birds. The bird holders are then moved with the birds, and cutting implements cut the neck skin and other neck tissue and break the neck of the bird as the bird and bird holders continue to move in the system. Each bird holder comprises a pair of legs formed in a V-shape with the apex of the V lower than the diverging ends of the legs, and the legs receive a bird about its shoulder area so that gravity and the incline of the diverging legs of the bird holder tend to place the neck of the bird at the apex of the V-shape and to tilt the bird so that its usually arcuate neck extends more in a downward direction.

17 Claims, 5 Drawing Figures

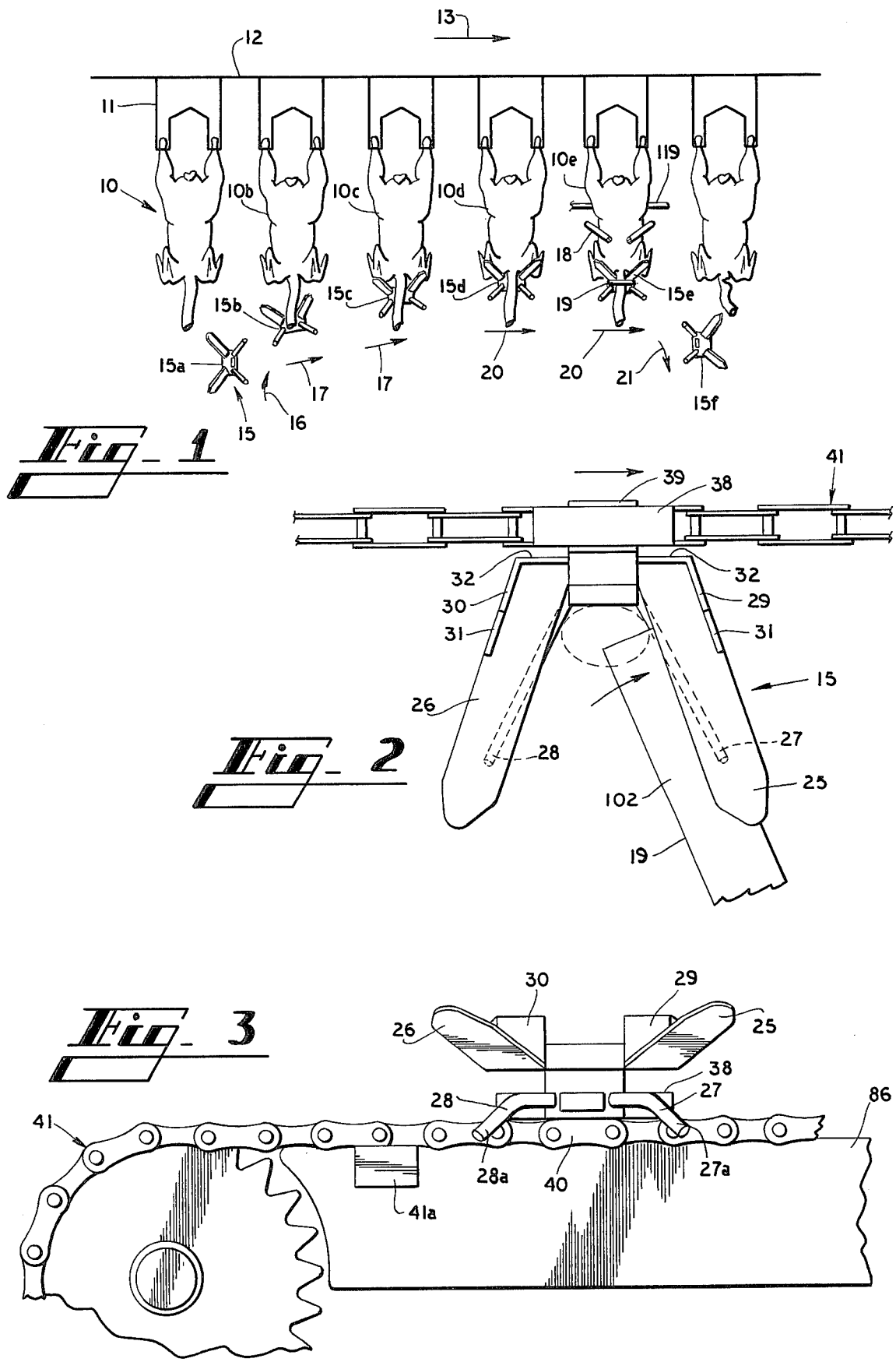

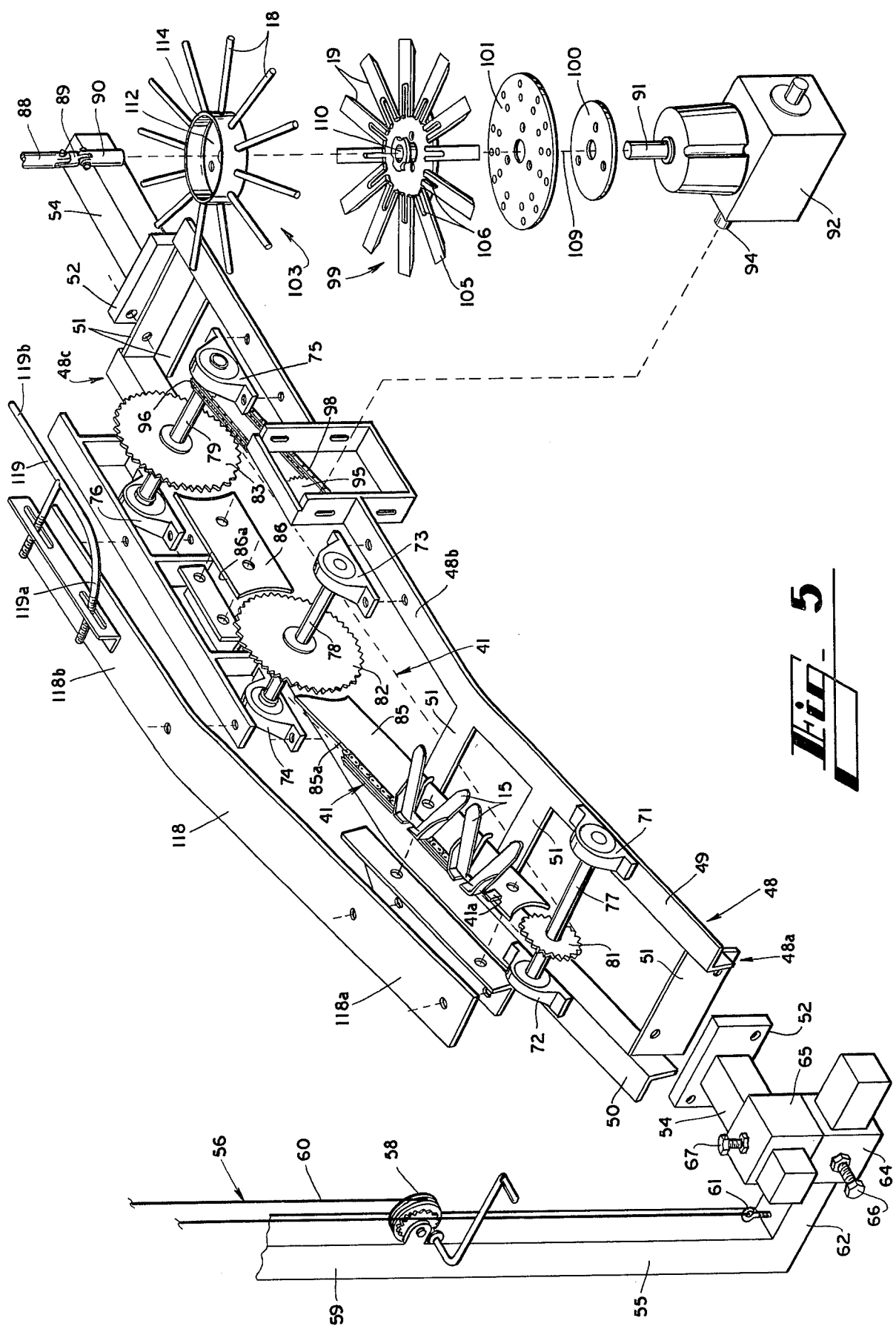

POULTRY PROCESSING SYSTEM

BACKGROUND OF THE INVENTION

In the poultry industry where chickens and other type birds are processed for consumption by the removal of feathers, feet, head, viscera, etc., it is desirable to move the birds rapidly through the processing steps with as little interruption as possible while effectively processing the birds and to utilize as little manual labor as possible. Most poultry processing plants utilize overhead conveyor systems where the birds are suspended by their legs from shackles in a head-down attitude, and the shackles are closely spaced from one another and are progressively moved by the conveyor system through the various work stations in the processing plant.

Various automatic neck-breaking and neck-cutting machines have been developed and utilized in the past on poultry processing lines; however, the prior art machines have been somewhat ineffective in that they frequently fail to properly break the necks of the birds and/or cut the neck tissue, so that this step must be performed manually at a subsequent work station on the line, and in some prior art systems, the equipment for automatically performing this function is difficult to maintain or requires a special detour in the conveyor line where the birds are moved laterally, upwardly or downwardly. Also, some of the prior art systems break and cut the neck tissue of the birds at different locations on the length of the neck of the bird, which results in a lack of uniformity in the end product, and which may result in some difficulty in removing the trachea, esophagus and crop as subsequent work stations along the process line.

SUMMARY OF THE INVENTION

Briefly described, the present invention comprises a poultry processing system wherein the necks of birds are accurately cut and broken at predetermined distances from the body of the birds substantially without regard to the varying sizes of the birds as a series of birds are moved in closely spaced series along a conveyor line.

A series of bird holders of V-shaped configuration move in equally spaced relationship from one another up an incline in timed relationship with the movement of the suspended birds along the processing line until they engage and at least partially support the bodies of the birds so that the necks of the birds protrude downwardly, and then the bird holders move the birds past a cutting system wherein a blade moves into registration with each of the bird holders to break the vertebra of the birds and to partially cut through the neck tissue so as to expose the trachea, esophagus and crop. The neck breaking system functions on an "in line" basis in timed relationship with the movement of the birds along the conveyor line, so that the movement of the birds is not retarded or deviated from the normal path along the conveyor line. The bird holders each include a pair of legs that are inclined upwardly and that diverge outwardly from each other in a V-shape from one side of a support block, and the neck of a bird is received between the V-shaped legs and the body of the bird tends to be received on the apex of the V-shaped bird holder. The bird tends to tilt as it is partially supported by the bird holder so that the truncated end of its arched neck tends to point more directly downwardly, in an attitude in which the neck is more easily cut and broken.

Thus, it is an object of the present invention to provide a poultry processing system wherein the necks of birds are accurately, expediently and rapidly cut and broken.

Another object of this invention is to provide a neck breaking system for use in a poultry processing plant wherein birds are received in closely spaced sequence along an approximately rectilinear path substantially without deviation from the path and the necks of the birds are broken and partially cut through to expose the trachea, esophagus and crop of the bird.

Other objects, features and advantages of the present invention will become apparent from reading the following specification, when taken in conjunction with the accompanying drawing.

BRIEF DESCRIPTION OF THE DRAWING

FIG. 1 is a progressive schematic illustration of the poultry processing system.

FIG. 2 is a top view of the bird holder.

FIG. 3 is a front view of the bird holder.

FIG. 5 is an exploded perspective illustration of the poultry processing system.

DETAILED DESCRIPTION

Figure 4:
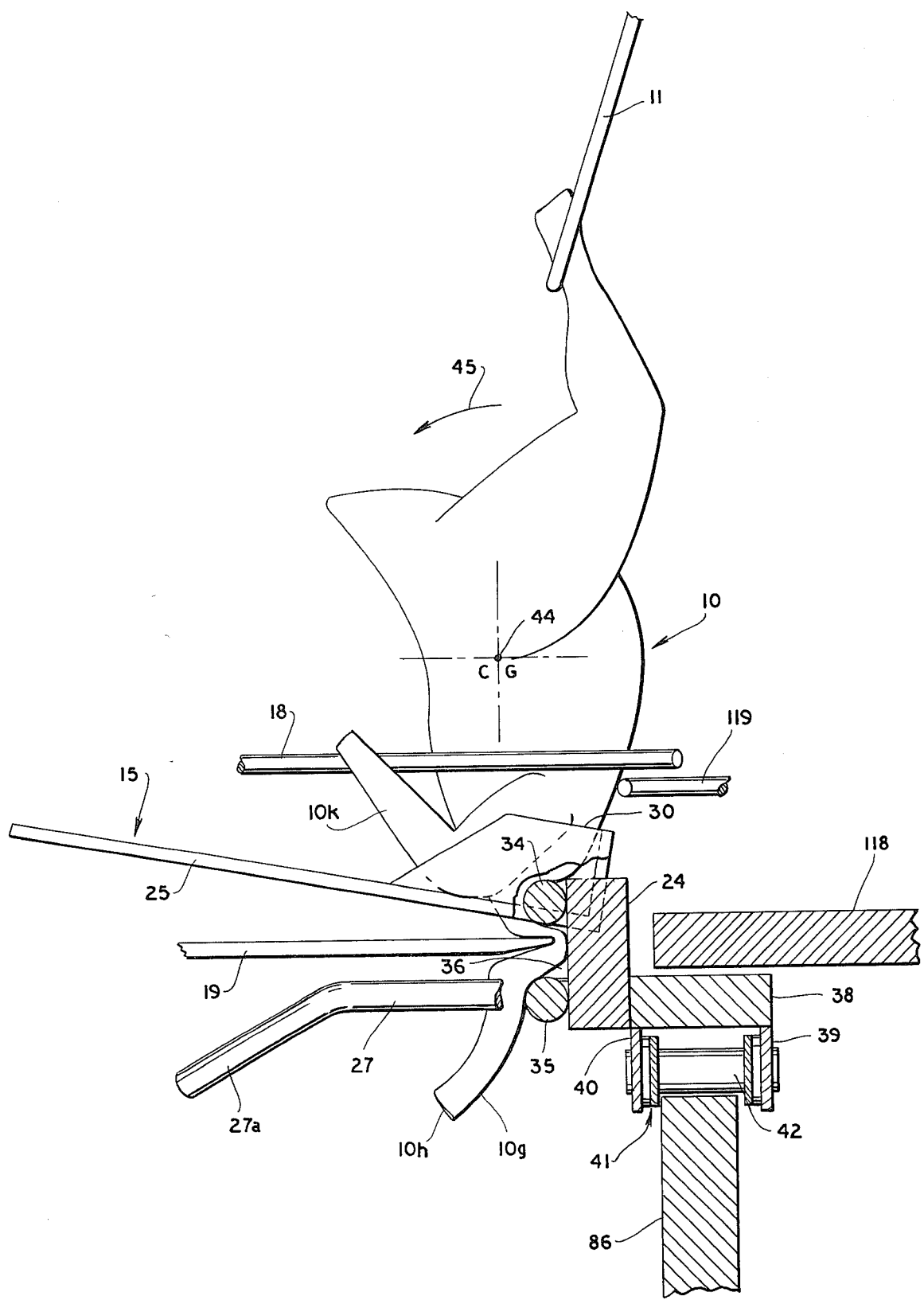
FIG. 4 is a side elevational view of the bird holder as it carries a bird through the neck cutter and breaker.

Referring now in more detail to the drawing, in which like numerals indicate like parts throughout the several views, FIG. 1 illustrates a plurality of birds 10 moving in closely spaced relationship along an overhead conveyor. Each bird is suspended in a neck-down attitude from a shackle 11 by its leg joints, and the shackles 11 are oriented by a guide bar 12 so that the shackles do not tend to twist during their movement. The conveyor drive system (not shown) functions to move the series of birds in the direction indicated by arrow 13 through the processing plant.

The poultry processing system illustrated in FIG. 1 is a neck-breaker and comprises a plurality of bird holders 15 which move in a closely spaced series into engagement with the birds 10. For example, the bird holder at position 15a moves in an arcuate direction as indicated by arrow 16 so as to begin an upwardly inclined movement as indicated by arrows 17 for bird holders at positions 15b and 15c. The bird holders at positions 15b and 15c engage the birds at positions 10b and 10c and lift and partially support the birds at position 10d, and the partially supported birds at position 10e are retained by retaining rods 18 in the bird holder at position 15e while a cutting blade 19 cuts and breaks the neck of the bird. The bird holders move along an approximately horizontal path as indicated by arrows 20 during the neck breaking and cutting steps, and the bird holder at position 15f releases the bird and moves through an arcuate path 21 downwardly from the area of the birds and return to position 15a.

As illustrated in FIGS. 2-4, each bird holder 15 comprises a support block 24, a pair of leg members 25 and 26 each mounted at one of their ends to the support block 24, and a pair of rod members 27 and 28 each connected at one of its ends to the support block 24. Leg members 25 and 26 are mirror images of each other and each includes an upstanding flange 29 and 30 on its opposite outside edges and partially across its back portion, with the side portions 31 of each flange extending along the outside edges of the legs 25 and 26 and with the rear portions 32 of the flanges extending across the rear edge of the legs 25 and 26.

Legs 24 and 26 are formed in a V-shaped with respect to each other and include an apex located generally at the support block 24, and the legs diverge generally outwardly from each other and away from one side of the support block 24. Rod members 27 and 28 are located below leg members 25 and 26, and are formed in a V-shape with their inner ends adjacent the apex at support block 24 and with their outer ends extending generally beneath the legs 25 and 26 and turned downwardly at 27a and 28a. Rod members 27 and 28 are located more closely adjacent each other at the apex area of the bird holder than are the legs 25 and 26, and the rod members 27 and 28 diverge from each other at a greater angle than the divergence of legs 25 and 26. As illustrated in FIG. 4, the support block 24 is built up with an additional thickness in the apex area of the V-shaped bird holder at 34 and 35 between the leg members 25 and 26 and between the rod members 27 and 28 to that a slot or recess 36 is formed between the leg members and the rod members at the surface of support block 24.

The support block 24 is rigidly connected to chain mounting block 38, and chain mounting block 38 includes a pair of depending chain-connecting elements 39 and 40 which are connectable to roller chain 41. When roller chain 41 is moved along its length with its rollers 42 having their longitudinal axes oriented in a horizontal attitude, the diverging V-shaped leg members 25 and 26 of the bird holder 15 extend in an upwardly inclined plane (FIGS. 3 and 4), and the end portions 27a and 28a of the rod members 27 and 28 extend downwardly and outwardly.

When a bird 10 is received by a bird holder 15, the upper body or shoulder area of the bird 10 will be received on and will rest on the V-shaped leg members 25 and 26, and since the leg members 25 and 26 are tilted upwardly from their apex, gravity will tend to urge the bird on toward the apex of the bird holder. The downwardly extending neck 10g of the bird will protrude downwardly from between the leg members 25 and 26 and downwardly between the rod members 27 and 28, over the slot 36 adjacent the support block 24 (FIG. 4), where a cutting member 19 (FIGS. 2 and 4) can engage and cut and break the neck 10g. The center of gravity 44 of the bird is usually located to one side of the apex of the bird holder 15, so that gravity tends to tilt the bird in the direction indicated by arrow 45, whereupon the arched or arcuate end portion 10h of the neck 10g tends to point more directly downward, so that the tendency of the neck to be askew and tend to point horizontally is reduced and the cutting element 19 is better able to make an accurate cut and break in the neck of the bird. Also, the rod members 27 and 28 tend to guide the neck 10g into the confines of the bird holder and to guide the neck toward the apex of the bird holder, and during the cutting operation to confine the neck of the bird at the slot 36 where the cutting element 19 can accurately engage, cut and break the neck. In the meantime, the upwardly extending flanges 29 and 30 tend to urge the wings 10k of the bird 10 away from the chain 42 and other moving components of the drive system, so that the bird will not become entangled in the drive system.

As illustrated in FIG. 5, the poultry processing system includes a framework 48 that is suspended from above, and which includes a pair of approximately parallel, spaced support bars 49 and 50 connected together by a plurality of crossbraces 51 along their length. Mounting yokes 52 are connected to the opposite ends of the framework 48 and each mounting yoke includes a rectangular shank 54. L-shaped brackets 55 (only one shown) are located in opposite ends of the framework 48 and are supported from an overhead support (not shown) by means of cable suspension system 56. A winch 58 is mounted on the upright leg 59 of bracket 55 and its cable 60 extends in an upward direction over a supported pulley (not shown) and then downwardly to eye bolt 61 mounted on horizontally extending leg 62. Sockets 64 and 65 are oriented at right angles with respect to each other and are rigidly connected together, and socket 64 receives the horizontal leg 62 of the L-shaped bracket 55 while socket 65 receives the rectangular shank 54 of mounting yoke 52. The set screws 66 and 67 of the sockets releaseably engage the L-shaped bracket and the mounting yoke so that the position of the framework 48 can be adjusted with respect to the L-shaped brackets.

Bearing assemblies 71, 72, 73, 74, 75 and 76 are mounted on the upper surface of support bars 49 and 50 and rotatably support axles 77, 78 and 79. Sprockets 81, 82 and 83 are mounted on the axles 77–79, and continuous roller chain 41 extends about sprockets 81–83. The support bars 49 and 50 are inclined at the entrance 48a of the framework 48 and extend upwardly to the midsection 48b where the framework then extends horizontally to the exit 48c of the framework. Thus, sprocket 81 is located lower than sprockets 82 and 83, and sprockets 82 and 83 are located at approximately the same level.

Although only two bird holders 15 are shown in FIG. 5, it will be understood that a series of bird holders 15 are mounted on the continuous roller chain 41 at equally spaced intervals which correspond to the spacing of the birds from one another, and the bird holders 15 move with the chain about the sprockets 81, 82 and 83. Chain guides 85 and 86 extend between the sprockets 81 and 82 and 82 and 83 respectively, with the upper edge 85a of chain guide 85 forming a track for the movement of the bird holder 15 and with the upper edge 86a of the chain guide 86 forming a track for the movement of the chain and bird holders 15 between sprockets 82 and 83. The continuous chain 41 includes a plurality of chain guide tabs 41a connected to the chain links at spaced intervals along the chain, and the chain guide tabs 41a tend to hold the bird holders 15 on the chain guides during the operation of the system.

The system is powered through a gear (not shown) that engages the driving chain of the overhead conveyor (not shown), and rotating shaft 88 extends downwardly from the gear to a slip joint 89 to universal joint 90. The universal joint 90 is connected to drive shaft 91 of gear box 92, and output shaft 94 of the gear box rotates drive sprocket 95. A continuous chain 98 extends from drive sprocket about driven sprocket 96, and driven sprocket 96 is mounted on axle 79 of sprocket 83. Thus, the direct drive connection of the system to the overhead conveyor causes the system to be driven in timed relationship with respect to the movement of the birds along the processing line and the bird holders and blades and other elements of the system are adjusted so as to be in phase with the moving birds.

Cutter mechanism 99 is mounted on the approximately vertically extending shaft 91 of gear box 92 and includes lower spacer disk 100, blade support disk 101, a plurality of radiating blades or anvils 19 and bird retaining assembly 103. The individual blades 19 are bolted to the blade support disk 101 and each blade 19 is pointed at its outer end 105 and defines a slot 106 at its inner end. The connecting bolts (not shown) extend through the slots 106 of the blades 19 so that the blades can be adjusted to have their sharpened ends 105 extend the proper distance away from the axis of rotation 109 of the cutter mechanism 99. Locking collar 110 locks the blade support disk 101 to the shaft 91 of the gear box 92. The blades 19 therefore rotate about an approximately vertical axis and the blades extend radially outwardly from the vertical axis.

Bird retainer 103 is mounted on blade support disk 101 and includes inner disk 112 with upstanding rim 114 connected thereto, and a plurality of radiating retaining bars 18. The bars 18 extend outwardly from the rim 114, and the bars 18 are offset with respect to the cutting blades 19 of the cutter mechanism. The bars 18 engage the opposite sides of the birds and urge the birds on into the bird holders. The retainer also functions to restrain the lateral movements of the birds and to otherwise stabilize the birds during the movement of the birds in the cutting and breaking zone of the system.

Upper chain guide 118 is connected to framework 48 and includes forward inclined portion 118a and rearward horizontal portion 118b, and extends over the continuous roller chain 41 so as to prevent the parts of the bird being processed through the system from becoming tangled in the continuous roller chain 41 and its sprockets or into other elements of the system. Cam bar 119 is supported by the chain guide 118 and includes a forward curved portion 119a and a laterally extending portion 119b. The cam bar 119 has its curved portion 119a offset rearwardly a short distance from the cutter mechanism 99 so that its curved portion 119a engages a bird just after the neck of the bird has been penetrated by a cutter blade 102 of the cutter mechanism 99. As the bird continues through the system, the cam bar 119 tends to urge the bird laterally while the blade still holds the neck of the bird, so that the neck of the bird is stretched at the cut portion of the neck so as to further expose the trachea, esophagus and crop of the bird before the bird is released by the blade and bird holder.

While this invention has been described in detail with particular reference to preferred embodiments thereof, it will be understood that variations and modifications can be effected within the spirit and scope of the invention as described hereinbefore and as defined in the appended claims.

We claim:

1. In a method of processing poultry or the like comprising moving a series of birds suspended in a neck-down attitude along an approximately rectilinear path, and as the birds are continuously moved along the rectilinear path, the steps of sequentially moving a series of bird holders up an incline from below the path of the birds in timed relationship with the movement of the birds until the bird holders at least partially support the birds at the shoulders of the birds with the necks of the birds hanging downwardly beneath the birds, moving the bird holders along an approximately horizontal path while the birds are partially supported by the bird holders, rotating a plurality of blades about an approximately vertical axis with the blades extending radially outwardly from the vertical axis, with the rotation of the blades being in timed relationship with the bird holders to move in a circular path progressively toward the bird holders and birds carried by the bird holders into contact with the necks of the birds at a predetermined distance beneath the portions of the shoulders of the birds being supported by the bird holders as the bird holders move along their approximately horizontal path and pinching the necks of the birds with the blades against the bird holders.

2. The method of claim 1 and further including confining the neck of the birds to a downwardly extending direction as the birds are supported by the bird holders.

3. The method of claim 1 and further including the step of urging the birds into the bird holders as the blades contact the birds.

4. In a method of processing poultry or the like wherein a series of birds are suspended in a neck-down attitude and moved in approximately equally spaced relationship in sequence along a path through a processing plant or the like, the steps of moving a plurality of V-shaped bird holders in timed relationship with movement of the birds along the path, partially supporting the body of the birds about the neck of the birds with the V-shaped bird holders with the apex of the V-shaped bird holders positioned lower than the ends of the diverging legs of the V-shape bird holders to hold the neck of the bird adjacent the apex of the V-shape, moving a cutting instrument in timed relationship with the V-shaped bird holders into the neck of each bird and pinching the neck with the cutting instrument against the apex of the bird holder beneath the portion of the bird supported by the bird holder to break the neck of the bird at a predetermined distance from the body of the bird.

5. The method of claim 4 and wherein the step of supporting the body of the birds with the V-shaped bird holders comprises orienting the apex of the V-shape of the bird holders on the breast side of the bird so that when the body of the birds are partially supported by the bird holders the center of gravity of the birds tends to tilt the upper portion of the birds toward the diverging ends of the V-shaped bird holders and tilt the necks of the birds so that the necks are directed more downward.

6. The method of claim 4 and wherein the step of moving a cutting instrument in timed relationship with the V-shaped bird holders comprises rotating a plurality of blade members about an upwardly extending axis in timed relationship with the movement of the V-shaped bird holders so that the blade members move progressively toward the necks of the birds carried by the bird holders.

7. The method of claim 4 and wherein the step of moving a plurality of V-shaped bird holders in timed relationship with the movement of the birds along the path comprises moving the bird holders up an incline from below the path of the birds until the bird holders support the birds.

8. The method of claim 4 and further including the step of limiting the lateral movement of the birds as the cutting instrument moves in timed relationship toward the neck of the birds.

9. Apparatus for processing poultry as a series of birds are moved in suspended, equally spaced, neck-down attitude along an approximately rectilinear path comprising a series of bird holders spaced from each other a distance approximately equal to the spacing of the birds, said bird holders each comprising a support element, a pair of legs each connected at one of its ends to and diverging in a V-shape in a common plane at an upward incline from said support element, means for moving the bird holders in timed relationship with the movement of the birds up an incline from below the path of the birds until the bird holders at least partially support the birds, a plurality of chisel blades each mounted at one of its ends on an upwardly extending rotatable axle, means for rotating said axle and moving said bird holders in timed relationship whereby said chisel blades move into registration with said bird holders, are thrust into the necks of the birds supported by said bird holders, and pinch the necks of the birds between said chisel blades and said support elements of said bird holders thus breaking the neck vertebra and partially cutting the neck skin.

10. The apparatus of claim 9 and wherein said bird holders further include a pair of rod members each mounted at one of its ends to said support element and each rod member extending outwardly from said support element below a leg member whereby the neck of the bird extends downwardly between said rod members.

11. Apparatus for processing poultry as a series of birds are moved in suspended, neck-down attitude along an approximately rectilinear path comprising a series of bird holders spaced from each other a distance approximately equal to the spacing between adjacent ones of the birds, said bird holders each comprising a support member, a first pair of leg members each mounted at one of its ends to said support member and extending outwardly and diverging in a V-shape from one side of said support member and a second pair of leg members positioned below said first pair of leg members with each leg of said second pair of leg members extending below a leg of said first pair of leg members whereby the body of a bird is received on said first pair of leg members and the neck of the bird extends downwardly between the leg members of said first and second pairs of leg members, means for moving said bird holders in timed relationship with the movement of the birds along the path of the birds and into contact with the birds to carry the birds along the path of the birds, and a plurality of chisel blades each mounted at one of its ends to an upwardly extending rotatable axle, means for rotating said axle and moving said bird holders in timed relationship so that said chisel blades move into registration with said bird holders at a level between the pairs of leg members, are thrust into the necks of the birds supported by said bird holders, and pinch the necks of the birds between said chisel blades and said support members of said bird holders thus breaking the neck vertebra and partially cutting the neck skin of the bird.

12. A bird holder comprising a support member, a pair of leg members each mounted at one of its ends on said support member and both extending outwardly and diverging at an upward incline in a V-shape from one side of said support member, a pair of rod members each mounted at one of its ends on said support member and each extending outwardly from said one side of said support member beneath a leg member, a slot formed in said bird holder below said leg members and above said rod members, whereby a chicken or the like is supported on the leg members with the neck of the chicken extending downwardly between the leg members and between the rod members adjacent the slot and the neck of the chicken is broken by moving an instrument into the slot.

13. The bird holder of claim 12 and wherein said support member includes means for mounting said bird holder on a driving chain.

14. The bird holder of claim 12 and wherein said pair of leg members are substantially flat and include flanges extending upwardly from their opposite outside edges for engaging the wings of the chicken.

15. The bird holder of claim 12 and wherein said rod members are mounted closer together on said support member than said leg members.

16. Apparatus for processing poultry as a series of birds are moved in suspended, equally spaced, neck-down attitude along an approximately rectilinear path comprising:

a series of bird holders for at least partially supporting the birds at the shoulders of the birds with the necks of the birds hanging downwardly beneath the birds;

conveyor means for sequentially moving said bird holders up an incline from below the path of the birds in timed relationship with the movement of the birds and then along an approximately horizontal path while the birds are partially supported by said bird holders;

a plurality of blades mounted about an approximately vertical axis, said blades extending radially outwardly from and rotatable about said vertical axis;

means for rotating said blades in timed relationship with the movement of said bird holders in a circular path progressively toward said bird holders and the birds carried by said bird holders and into contact with the necks of the birds at a predetermined distance beneath the portions of the birds being supported by said bird holders;

whereby the neck vertebra of the birds are broken and the neck skin of the birds is partially cut by pinching the necks of the birds with said blades against said bird holders.

17. In a method of processing poultry wherein a series of birds with the heads of the birds removed and with the necks arched from the breast toward the back are suspended in a neck down attitude and moved in approximately equally spaced relationship in sequence along a rectilinear path, the improvement therein of moving a series of approximately equally spaced bird holders in sequence and in timed relationship with the movement of the birds up an inclined path until the birds are partially supported at the shoulders of the birds by the bird holders and until the birds tilt in the bird holders to direct the distal end of the neck more downwardly, moving a cutting instrument into the neck of each bird at a predetermined distance below the level at which the birds are supported by the bird holders to break the necks of the birds while the birds are tilted.

* * * * *